May 6, 1924.
J. HUNA ET AL
1,492,880
CHRISTMAS TREE STANDARD
Filed Sept. 14, 1922
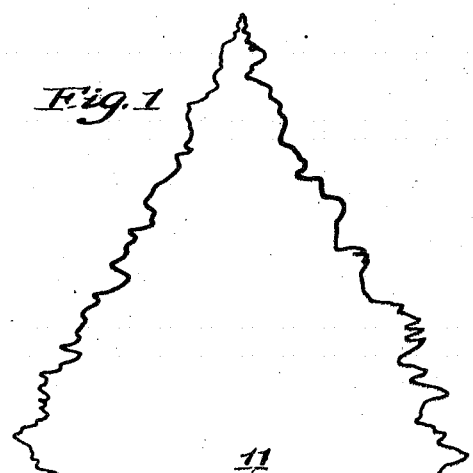
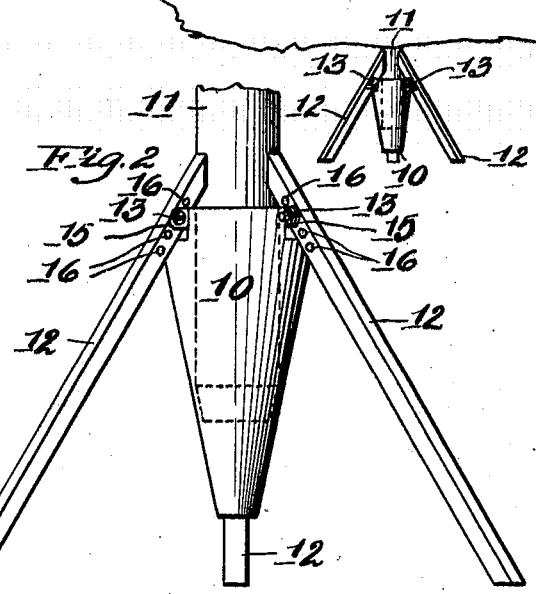
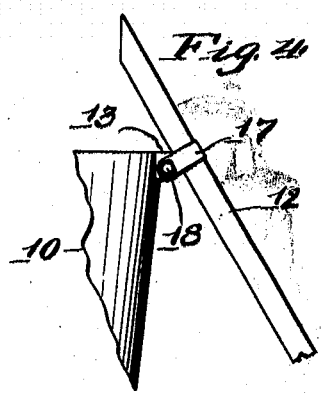
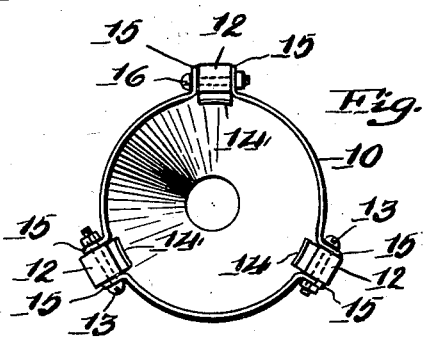
Inventors
John Huna,
John P. Lorenz
By John E. Stryker
Their Attorney Patented May 6, 1924.

1,492,880

UNITED STATES PATENT OFFICE.

JOHN HUNA AND JOHN P. LORENZ, OF ST. PAUL, MINNESOTA.

CHRISTMAS-TREE STANDARD.

Application filed September 14, 1922. Serial No. 588,132.

*To all whom it may concern:*

Be it known that we, JOHN HUNA and JOHN P. LORENZ, citizens of the United States, residing at St. Paul, in the county of Ramsey and State of Minnesota, have invented new and useful Improvements in Christmas-Tree Standards, of which the following is a specification.

The object of our invention is to provide a novel, simple and efficient support or standard particularly adapted for use on Christmas trees.

A further object of our invention is to provide a device of this kind which requires no nailing or other fastening to the tree and is adapted to be quickly and easily adjusted to support trees of various sizes.

As is well known the standards used on decorative trees, such as the evergreen trees used at Christmas time, have been constructed usually from wooden slats which are troublesome to secure to the tree trunk because of the hardness of the wood of the tree. This frequently has caused the expenditure of a large proportion of the cost of the tree on the standard.

Our improved standard is inexpensive and easy to attach and does away with the necessity for the use of nails or other fastening devices. The trunk of the tree to be supported is merely inserted in a socket in our standard and when so inserted the weight of the tree, by reason of the peculiar arrangement of the supporting legs, causes said legs to securely grip the trunk.

Other advantages and objects of our invention will appear and be more fully pointed out in the following specification and claims.

In the accompanying drawings, which illustrate the best form of our device at present known to us, Figure 1 is a side elevation of our device showing it in use on a tree; Fig. 2 is an enlarged detail elevation of the same; Fig. 3 is a plan view of the standard, the legs being shown in vertical position and Fig. 4 is a detail fragmentary view of an alternate form of fastener for the legs.

Referring to the drawings, our device consists of a socket 10, adapted to receive the trunk 11 of the tree to be supported, and legs 12 which are pivotally joined by bolts 13 to the socket 10 near its upper edge. The socket 10 has the form of a hollow truncated cone with its apex downward and the upper edge of said socket is provided with three slots 14 and a series of pairs of ears 15. Each leg 12 is held between a pair of the ears 15 by one of the bolts 13 which extends through suitable perforations in said ears and through any one of a series of holes 16 in said leg. The slots 14 permit the upper ends of the legs 12 to extend inwardly to engage the trunk 11.

Referring to Fig. 4, the alternate form of fastener for the legs 12 consists of a clip 17 which surrounds the leg 12 and is arranged to be clamped thereon by a bolt 18. The latter bolt passes through suitable perforations in the clip 17 and in the ears 15 on the socket 10.

In use the trunk of the tree to be held upright is inserted in the socket 10 and the bolts 13 are placed in the appropriate holes 16 so that the legs 12 are maintained in suitable oblique or inclined position by engagement with the trunk 11. When thus adjusted, the weight of the tree on the legs 12 causes said legs to firmly grip the trunk 11 between their upper ends. By making the socket 10 conical in shape and by providing a plurality of holes 16 for each of the bolts 13, the standard is adapted for use on trees of various sizes. Thus, as will be readily understood when it is desired to mount a tree having a smaller trunk than the one shown in the drawings, the trunk would be inserted further into the socket 10 and the bolts 13 would be placed in a series of the holes 16 further down on the legs 12.

The alternate form of fastener shown in Fig. 4 has the advantage of doing away with the holes 16 in the legs 12. Adjustment of the position of the clips 17 on the legs 12 is secured by loosening the bolts 18, sliding said legs through said clips to the desired position and then tightening said bolts to firmly grip the legs 12 in the clips 17.

It will be readily understood that a number of changes might be made in the specific construction shown in the drawings without departing from the spirit of our invention and that our standard is adapted to support the base of any staff or pole in upright position as well as the tree shown.

Having described our invention what we claim as new and desire to protect by Letters Patent is:

1. In a standard, a central socket formed to receive trunks of different sizes, obliquely inclined legs arranged to constitute a supporting base for said socket and to grip a trunk between their upper ends, and means adjustable longitudinally on said legs for pivotally joining said legs to said socket whereby the size of the base may be increased to support the larger trunks.

2. In a standard, a socket formed to receive trunks of different sizes, obliquely inclined legs arranged to support said socket and to grip a trunk between their upper ends, and clamps pivotally joining said legs to said socket whereby the length of said legs above said clamps may be adjusted to grip trunks of different sizes.

In testimony whereof, we have hereunto signed our names to this specification.

JOHN HUNA.
JOHN P. LORENZ.